UNITED STATES PATENT OFFICE.

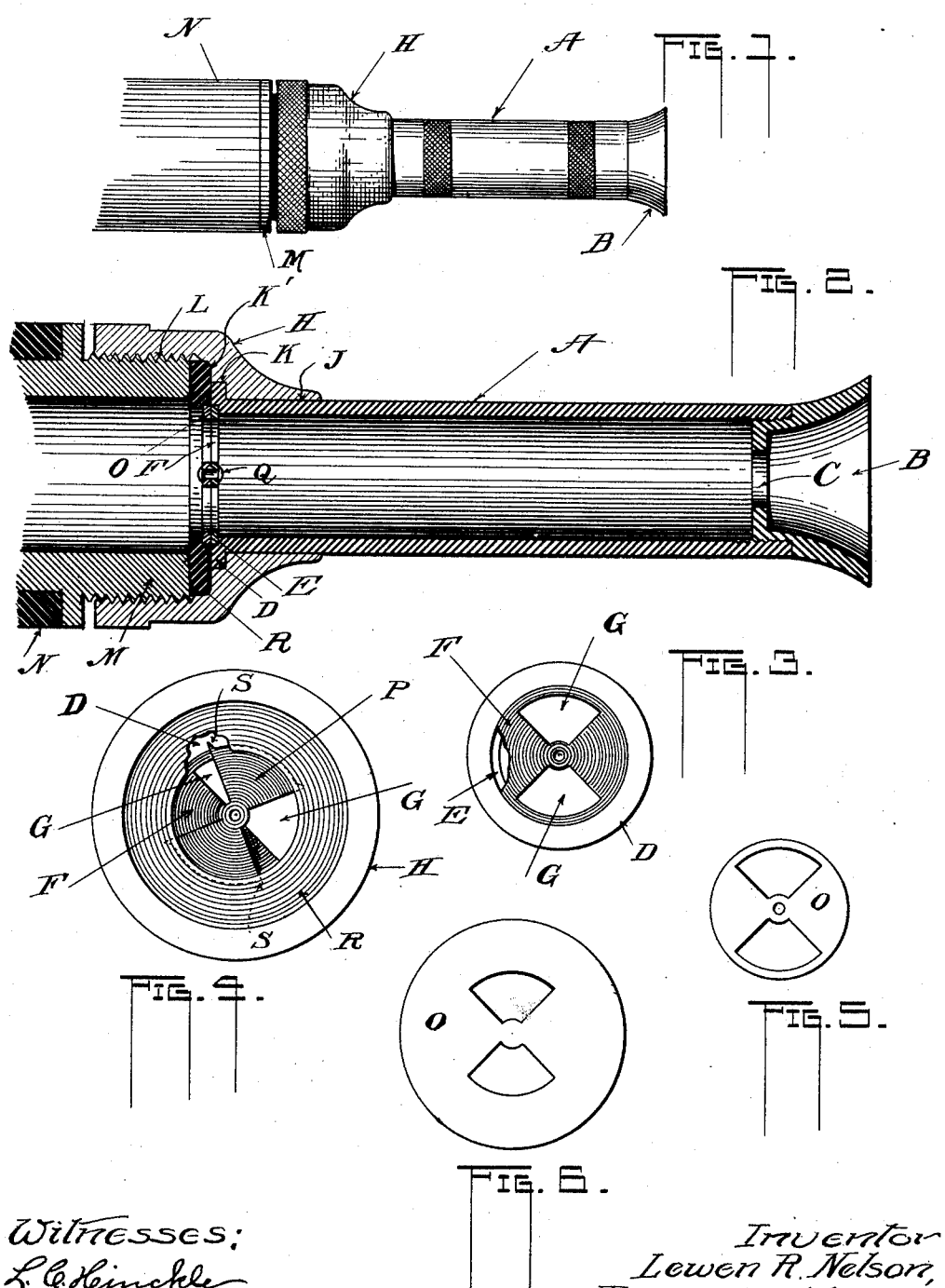

LEWEN RUSSELL NELSON, OF PEORIA, ILLINOIS, ASSIGNOR OF ONE-HALF TO CENTRAL BRASS & STAMPING CO., A CORPORATION OF ILLINOIS.

NOZZLE.

1,006,450.  Specification of Letters Patent.  Patented Oct. 17, 1911.

Application filed August 23, 1909.  Serial No. 514,206.

*To all whom it may concern:*

Be it known that I, LEWEN R. NELSON, citizen of the United States, residing at Peoria, in the county of Peoria and State of Illinois, have invented certain new and useful Improvements in Nozzles; and I do hereby declare that the following is a full, clear, and exact description of the invention, which will enable others skilled in the art to which it appertains to make and use the same.

This invention pertains to improvements in hose nozzles.

An important object of the invention is to materially simplify and cheapen the construction of a hose nozzle. Also to provide a nozzle wherein the parts are all held in position without the employment of screws or other unnecessary parts.

An object also is to provide a nozzle wherein a valve which governs the discharge of water is placed upon an apertured portion of the nozzle and held in position by means of the usual washer or gasket and a threaded member carried by the hose or by some part that will answer in the same capacity.

Another object is to provide a nozzle in which said threaded member, or other member, will serve to hold all of the parts of the nozzle together but this will be clearly pointed out in the following specification.

Still another object is to provide a nozzle whose parts can be formed from tubing.

A preferred embodiment of my invention is illustrated in the accompanying drawings, in which—

Figure 1 is an elevation of the hose nozzle shown in its natural size. Fig. 2 is a longitudinal section of the nozzle greatly enlarged. Fig. 3 is a plan of the inner rear end of a stem of the nozzle. Fig. 4 is an elevation of the rear end of the nozzle and parts showing a form of valve used therewith. Fig. 5 is a plan of another form of valve, and Fig. 6 is a plan of the same form of valve but of a larger size.

Referring to the drawings, it will be seen that the nozzle comprises a stem A which consists preferably of a piece of tubing internally threaded at its outer or forward end to receive a flared tip B provided with a discharge opening C, its other or rear end having an annular flange D formed up upon it and counterbored at E, Figs. 2 and 5 to receive a valve F having perforations G, there being two of such apertures and disposed diametrically opposite one another. Said valve may be a part of the stem A, however, and may have but one aperture.

H represents a sleeve which may be a casting, or spun from sheet metal, and provided with a bore J substantially of the same diameter as the stem and adapted to receive that member. Said sleeve is counterbored at K and receives the flange D of said stem and has a surface parallel to the rear face of the stem as at K' in Fig. 2 and said sleeve has a large threaded bore as indicated at L to receive the usual fitting M carried by the hose indicated at N.

Resting against the valve F described is a member O which I term a valve. This valve-seat as shown in Fig. 5 may be a mere duplicate of the valve F both as to size and form or it may be larger in diameter as in Fig. 6 so as to fit into the threaded bore L, or as shown in Fig. 4 at P, it may be in the form of two connected segment-shaped parts each of which is large enough to cover one of the apertures G of the said valve F. The valve-seat may be pivoted to the valve by means of a pivot-pin Q, but I may not use said pivot-pin, merely placing the valve-seat, upon the plate F as shown in Fig. 4, and upon this is placed an ordinary ring or gasket or annulus R of rubber or other yielding material the hole or bore of which may be slightly less in diameter than the diameter of the valve-seat as shown in Figs. 2 and 4 so as to partially overlie it; the full diameter of said gasket being such as to fit into the largest or threaded bore of the sleeve as shown, or said hole or bore may be substantially of the same diameter as the valve-seat of the form shown in Fig. 4 at P whose periphery may have a series of lugs or points S as shown to embed themselves in the rubber either method providing for friction between the said gasket and the valve seat to hold the latter.

The fitting M before described when screwed into the sleeve bears against the ring or gasket R and forces it against the marginal portion of the valve-seat or upon said lugs S, as the case may be, and said valve-seat can thus be centrally held in position and is also held from turning since the friction that must exist between the gasket and the valve-seat is greater than that between the latter and the plate F which lie upon one another. Other means for holding the fitting M, or its equivalent, within the sleeve may be resorted to, of course, without necessarily providing for the usual threaded engagement, and wherein a variable pressure can still be placed upon the gasket or annulus.

The stem A is designed to rotate within the sleeve H and as it rotates beneath the valve-seat the openings G in its plate will be closed or exposed as they pass the closed or open portions of said valve-seat and thus the amount of discharge and the form thereof can be governed, i. e. whether a stream or spray.

The friction imposed upon the stem A through the gasket is regulated by screwing the member M more or less tightly in place in the sleeve against said gasket R so that the said stem can be turned more or less easily. The form of valve seat in Figs. 2 and 5 as already stated can be a mere duplicate of the valve F in Fig. 3 and can be made of much larger diameter so that it will fit into the large threaded bore of the sleeve in the same manner as the gasket R and when made of a yielding material will answer both as the gasket and the valve-seat.

The nozzle is easily and quickly assembled:—The stem is dropped into the bore of the sleeve and the valve-seat is then placed centrally upon the rear end of said stem, after which the gasket R is inserted and the fitting M screwed into place against it, or, in lieu of the valve-seat and gasket, the combined valve-seat and gasket shown in Fig. 6 is used. It is to be noted that no screws or rivets are necessary to hold the parts together since the members are secured firmly in proper relation by merely screwing the hose fitting M into the sleeve although some other means that will serve to hold the parts together substantially in the same way may be used although the member M described is perhaps preferable.

When the member shown in Fig. 6 is employed there is one part less used in the construction of the nozzle although the effect of both the gasket and valve-seat is obtained. It is clear that the advantage of simplicity of construction and consequent cheapening must result in producing a nozzle of the form described and I believe that the way in which the nozzle is assembled is new when the fitting M or some other member having the same purpose in view is used as the holding member for all of the parts.

A point of importance in my nozzle is that the sleeve H has an annular face beyond and surrounding the outer marginal edge of the stem so that the gasket can lie upon it and properly overlie the joint between it and the stem and thus prevent leakage through said joint. Furthermore, by making the valve smaller in diameter than the rear end of the stem the gasket will overlie the marginal edges of both of them and hold the former so that the stem must turn independently of it.

Of importance, also, is the fact that the gasket overlies a considerable portion of the said marginal edge of the stem beyond the margin of the valve insuring thereby that the joint above mentioned will be properly and thoroughly covered and protected against the leakage mentioned.

Having thus described my invention, I claim:—

1. A hose nozzle comprising in its construction a stem having an apertured rear end, a member in which its said rear end is held and adapted to swivel, an apertured member at the rear end of the stem, said stem adapted to turn relative to it, and a third member interposed between the stem and the second described member and in control of the aperture of said stem, the said second member having engagement with the third and in control of it.

2. A hose nozzle comprising in its construction a stem having an apertured rear end and a flange, a member in which its rear end is held by said flange and in which said stem is adapted to swivel, an apertured member at the rear end of the stem, said stem adapted to turn relative to it, and a third member interposed between the stem and the second described member and in control of the aperture of said stem, the said second member having engagement with the third and in control of it.

3. A hose nozzle comprising in its construction a stem having an apertured rear end and a flange, a member in which its rear end is held by said flange and in which said stem is adapted to swivel, an apertured member at the rear end of the stem within the first said member, said stem adapted to turn relative to it, and a third member interposed between the stem and the second described member, the said second member partially overlying the third and in control of it.

4. In a hose nozzle the combination of a stem, a member in which the stem is held and adapted to swivel, said stem having an apertured rear end, a closure for the said apertured end, a yielding packing member partially overlying the stem and the closure and engaging the latter and in control of it and adapted to turn relative to the stem.

5. In a hose nozzle the combination of a tubular stem, a sleeve in which the stem is held and adapted to swivel, said stem having an apertured rear end within said sleeve, an adjustable closure at the rear of the stem to control its aperture, a yielding member to partially overlie the closure and engage and control it and also partially overlying the stem, and means to place a variable pressure upon the yielding member and through it to place pressure upon the said closure.

6. In a hose nozzle the combination of a tubular stem, a sleeve in which the stem is held and adapted to turn, an annular shoulder on one of the members, the other of them having an annular recess to receive the shoulder, the stem having an apertured rear end constituting a valve, a valve-seat to lie upon the stem and adapted for closing its aperture, and a member lying within the sleeve and having one of its surfaces lying upon the valve-seat and the said stem.

7. In a hose nozzle the combination of a tubular stem, a sleeve in which the stem is held and adapted to turn, a lateral extension on one of the members to engage the other to prevent the separation of the two in a longitudinal direction, the stem having an apertured end within the sleeve, a valve-seat lying upon the said end to control the aperture therein and itself having an aperture, a yielding member having one of its surfaces lying upon the end of the sleeve and said valve-seat and adapted to engage and hold the latter fixed relative to the said sleeve, and a second member in engagement with the sleeve to engage the opposite surface of said yielding member.

8. A hose nozzle comprising a tubular stem having an apertured rear end, a sleeve in which the rear end of the stem is carried and adapted to turn, means on one of the members to engage the other to prevent separation of said members longitudinally, a closure for the aperture of the stem, the stem and said closure adapted to turn relatively, a yielding member to engage the closure and the stem and a portion of the sleeve, and a second member to engage the sleeve and adjustable relatively thereto and to the yielding member and adapted to exert pressure upon the latter for the purposes set forth.

9. In a hose nozzle the combination of a sleeve, a hollow stem therein having a lateral extension to engage the sleeve, said stem within the sleeve having a closed end provided with an aperture, a valve-seat lying upon the said closed end and adapted to close said aperture, and a ring of yielding material lying against the valve-seat and in control of the same.

10. A hose nozzle comprising a hollow stem provided with an annular flange at one end and an aperture, a member provided with a bore and a counterbore to receive the stem and its flange, a member to close the aperture and itself provided with an aperture, a gasket overlying and engaging the marginal portion of the last named member, and the sleeve, and in control of the former.

11. A hose nozzle comprising a hollow stem provided with an annular flange at one end, a member bored and counterbored to receive said stem and flange, said member having a surface flush with the rear surface of the end of said stem and flange, a closure for the end of the stem within the member, the same being provided with an aperture, a valve-seat to cover the aperture, a gasket of yielding material lying upon said valve-seat and the end of the stem and the surface of the member adjacent thereto and held within the latter and holding the valve-seat fixed in position relative to said member.

12. A nozzle comprising a sleeve having a threaded bore and a smaller smooth bore, an open tubular stem lying within the latter and provided with a flange, a member having an aperture therein and covering the open end of the stem within the sleeve, a valve seat resting upon the member and adapted for controlling the aperture thereof, and a gasket of yielding material carried by the stem to engage the valve-seat and hold it fixed relative to said sleeve, and means to exert pressure upon the said gasket.

13. A nozzle comprising a sleeve, a stem projecting from one of its ends, said stem having a rear apertured end within the sleeve, a valve-seat to lie upon said end to cover the aperture of the said end, an extension on the marginal portion of said valve-seat, a ring of yielding material overlying the end of the stem and a portion of the sleeve to cover the joint between them to prevent leakage and engaging the said extension of the valve-seat, and means to exert pressure upon said ring.

14. A nozzle comprising a sleeve, a stem projecting from one of its ends, said stem having a rear apertured end within the sleeve, a valve-seat to lie upon said end to cover the aperture of the said end, a plurality of extensions on the marginal portion of the valve-seat, a ring of yielding material overlying the end of the stem and a portion of the sleeve to cover the joint between them to prevent leakage and engaging the said extension of the valve-seat, and means to exert pressure upon said ring.

15. A nozzle comprising two tubular members adapted to swivel one within the other, one having a face perpendicular to its bore and having an annular recess extending into its said face, the other member having an annular flange to lie in said recess flush with the said face, a closure for the end of the inner member and provided with an opening, a valve-seat to rest upon the closure, and a ring of yielding material lying upon the said valve-seat and covering its edge and overlying the flange and the face of the two said members.

16. A nozzle comprising two tubular members adapted to swivel one within the other, one having a face perpendicular to its bore and having an annular recess extending into its said face, the other member having an annular flange to lie in said recess flush with the said face, the inner end of the inner member having an apertured end also flush with the face of the other member, a valve lying upon said end to close the aperture, and a ring of yielding material to overlie the margin of the valve and the flange and the face of the members.

17. As an article of manufacture, a hollow stem provided with an apertured rear end, a sleeve in which said rear end is adapted to swivel, said sleeve having an annular face surrounding said stem, and a valve lying centrally upon the rear end of the stem, its greatest diameter being less than the diameter of the said rear end of the stem to leave on the latter an exposed marginal edge.

18. As an article of manufacture, a hollow stem provided with an apertured rear end, a sleeve in which said rear end is adapted to swivel, said sleeve having an annular face surrounding said stem, and a valve centrally pivoted to the said end of the stem, its greatest diameter being less than said end leaving an exposed marginal portion on the same.

19. In a hose nozzle the combination of a hollow stem provided with an apertured rear end, a sleeve in which said rear end is held and adapted to swivel, a valve overlying said rear end and pivoted centrally thereto consisting of two connected segmental portions, the greatest diameter of the valve being less than the diameter of the rear end of the stem to expose the marginal edge of the same, and a gasket overlying the marginal edge of the valve and the exposed marginal edge of the said stem.

20. In a hose nozzle the combination of a hollow stem provided with an apertured rear end, a sleeve in which said rear end is held and adapted to swivel and having an annular face parallel to that of the said rear end and extending beyond and around the marginal portion of said rear end, a valve overlying the said apertured end, its greatest diameter being less than the diameter of the rear end of the stem to leave on the latter an exposed marginal edge, and a gasket overlying the said annular face of the sleeve, and the marginal edges of the stem and the valve.

In testimony whereof I affix my signature, in presence of two witnesses.

LEWEN RUSSELL NELSON.

Witnesses:
M. BAUMGARTNER,
JOS. STUBER.

---

Copies of this patent may be obtained for five cents each, by addressing the "Commissioner of Patents, Washington, D. C."